United States Patent [19]

Kohno et al.

[11] Patent Number: 5,245,889

[45] Date of Patent: Sep. 21, 1993

[54] FLYWHEEL

[75] Inventors: Satoshi Kohno; Hirofumi Ara; Isao Ito; Tatsuya Morishita, all of Atsugi, Japan

[73] Assignees: Atsugi Unisia Corp.; Nissan Motor Co., Ltd., Japan

[21] Appl. No.: 866,034

[22] Filed: Apr. 8, 1992

[30] Foreign Application Priority Data

Apr. 8, 1991 [JP] Japan .................. 3-074888
Sep. 27, 1991 [JP] Japan .................. 3-248726

[51] Int. Cl.⁵ .................. F16F 15/22; F16F 15/10
[52] U.S. Cl. .................. 74/573 R; 74/574; 192/70.17; 192/103 R; 192/106.2; 464/68
[58] Field of Search ............ 74/572, 574, 573 R; 192/106.1, 106.2, 70.17, 3.31, 48.3, 103 R; 464/66, 68

[56] References Cited

U.S. PATENT DOCUMENTS

| | | | |
|---|---|---|---|
| 4,638,684 | 1/1987 | Maucher | 74/574 |
| 4,779,483 | 10/1988 | Andrá et al. | 74/574 |
| 4,782,933 | 11/1988 | Jáckel et al. | 192/106.2 X |
| 4,813,295 | 3/1989 | Drexl et al. | 74/572 |
| 4,838,395 | 6/1989 | Chasseguet et al. | 74/574 X |
| 4,850,244 | 7/1989 | Eckel et al. | 74/574 |
| 4,856,636 | 8/1989 | Meinhard | 192/70.17 |
| 4,889,009 | 12/1989 | Friedmann et al. | 74/574 |
| 4,901,596 | 2/1990 | Reik et al. | 74/574 |
| 4,904,226 | 2/1990 | Chasseguet | 464/68 |
| 4,914,949 | 4/1990 | Andrá et al. | 74/574 |
| 4,928,486 | 5/1990 | Despres | 192/106.2 X |
| 4,932,286 | 6/1990 | Fukushima | 74/574 |
| 5,139,124 | 8/1992 | Friedmann | 74/574 X |

FOREIGN PATENT DOCUMENTS 2-6285 2/1990 Japan .
2152159A 7/1985 United Kingdom .

Primary Examiner—Leslie A. Braun
Assistant Examiner—Andrea Pitts
Attorney, Agent, or Firm—Lowe, Price, LeBlanc & Becker

[57] ABSTRACT

There is proposed an assembly for damping vibrations in a torque transmitting arrangement between an engine and an input part of a transmission. The assembly comprises a first flywheel connected to the engine, and a second flywheel connectable to the input part of the transmission. The first and second flywheels are rotatable relative to each other. At least one damper includes spring means operative to resiliently oppose rotation of the flywheels relative to each other. The assembly also comprises at least one lock-up mechanism including centrifugal force responsive means operative to prevent rotation of the flywheels relative to each other after the damper has become idle when rotation of the engine is lower than a predetermined speed value.

2 Claims, 6 Drawing Sheets

FLYWHEEL

BACKGROUND OF THE INVENTION

The present invention relates to a flywheel and, more particularly, to a torsion damping assembly for damping vibrations in a torque transmitting arrangement between an engine and an input part of a transmission in a motor vehicle.

An assembly is known which is designed to damp vibrations in a torque transmitting arrangement between an engine and an input part of a change-speed transmission. Such as assembly is disclosed, for example, in U.S. Pat. No. 4,901,596 issued on Feb. 20, 1990 to Reik et al. This known assembly comprises a first flywheel connected to an engine, a second flywheel connected to an input part of a change-speed transmission, and a damper including energy absorbing spring means operative to yieldably oppose rotation of the flywheels relative to each other.

Japanese Utility Model Application Second Publication 2-6285 discloses a torsion damping assembly which comprises a first flywheel connected to an engine, a second flywheel connected to a friction clutch, and a damper including spring means operative to yieldably oppose rotation of the flywheels relative to each other. In order to suspend action of the damper once there occurs rotation of the flywheels relative to each other by a predetermined angle when engine speed drops below idle speed, a lock-up mechanism including a centrifugal force responsive lock component is received in a radial bore of a rim of the first flywheel. The rim surrounds a reduced diameter portion of the second flywheel which is formed with two angularly distant lock component receiving spaces. According to this known torsion damping assembly, the damper is kept in a stressed state when the lock component is received in one of the lock component receiving spaces. Besides, the lock component is not always engaged with one of the lock component receiving spaces when the engine is stationary.

An object of the present invention is to provide a torsion damping assembly wherein flywheels are allowed to rotate relative to each other due to the action of a damper at an engine speed above a predetermined engine speed, but the action of the damper is suspended to render the flywheel as a unit upon and after starting the engine until the engine speed reaches the predetermined engine speed.

SUMMARY OF THE INVENTION

According to the present invention, there is provided an assembly for damping vibrations in a torque transmitting arrangement between an engine and an input part of a transmission, comprising:
a first flywheel connectable to the engine;
a second flywheel connectable to the input part of the transmission;
said first and second flywheels being rotatable relative to each other;
at least one damper including spring means operative to yieldably oppose rotation of said flywheels relative to each other; and
at least one lock-up mechanism including centrifugal force responsive means operative to prevent rotation of said flywheels relative to each other after said damper has become idle when rotation of the engine is lower than a predetermined speed value.

DETAILED DESCRIPTION OF THE INVENTION

Figure 1:
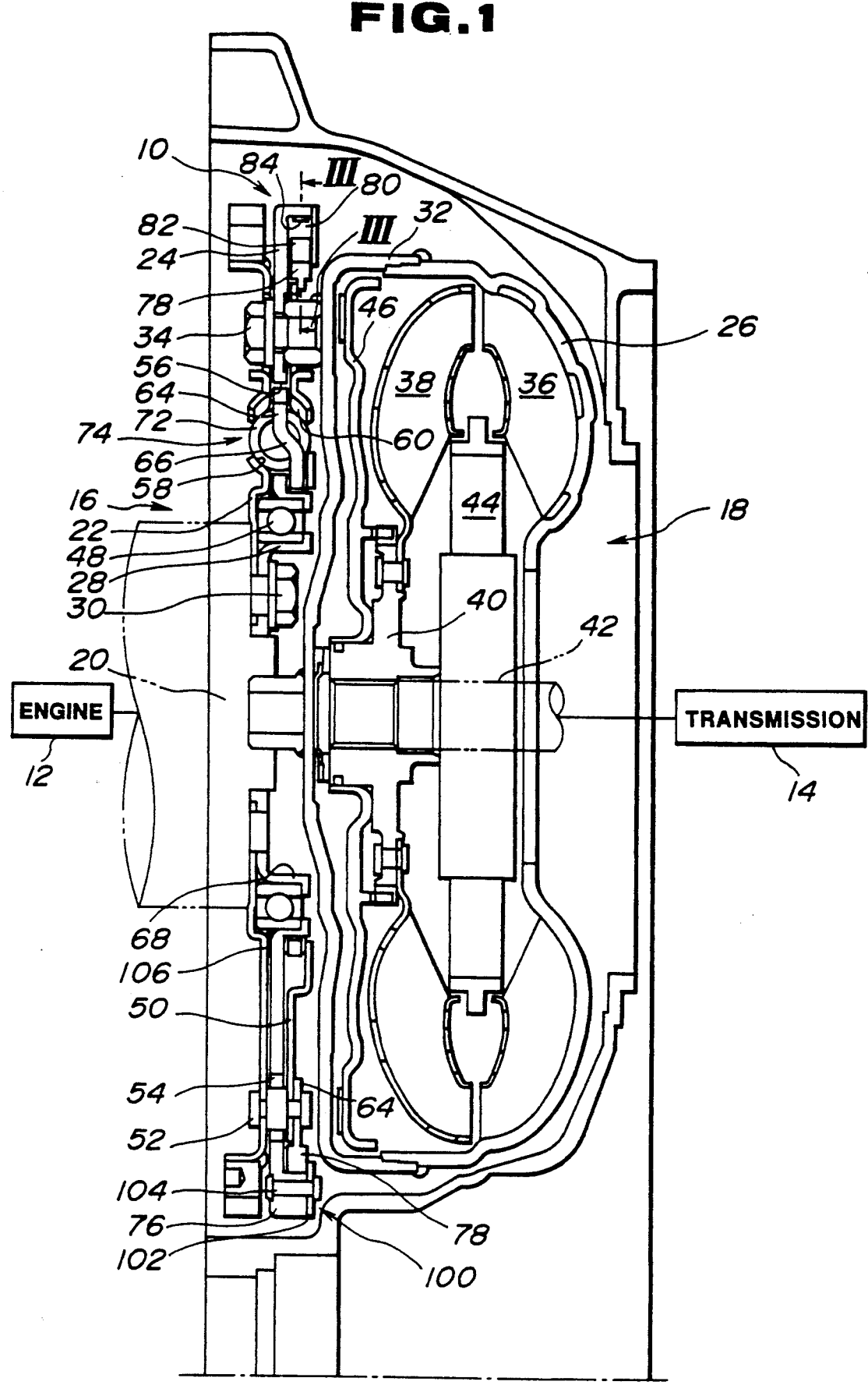
FIG. 1 is an axial sectional view of a first embodiment of a torsion damping assembly with a lock-up mechanism according to the present invention, the section of the damping assembly being taken through the line I—I of FIG. 2.

Referring to FIGS. 1, 2, 2A, 3 and 4, there is shown a torsion damping assembly 10 which operates between an internal combustion engine 12 and a change-speed transmission 14 in a motor vehicle. The assembly 10 comprises two coaxial units 16 and 18 the first of which includes a crankshaft 20 which is driven by the engine 12 and a first flywheel 22, and the second of which comprises a second flywheel 24 and a torque converter 26. The crankshaft 20 is affixed to the first flywheel 22 and a reinforcement plate 28 by bolts 30, and the housing 32 of the torque converter 26 is affixed to the second flywheel 24 by bolts 34. The torque converter 26 comprises a pump impeller 36 driven by the housing 32, a turbine runner 38 with a turbine hub 40 splined to an input part or turbine shaft 42 of the transmission 14, and a stator 44 situated between the pump impeller 36 and turbine runner 38. The torque converter 26 further comprises a lock-up clutch 46.

Disposed between the reinforcement plate 28 of the first flywheel 22 and the second flywheel 24 is a bearing 48. The first flywheel 22 is in the form of a disc which is rigidly connected to a disc 50 by distancing elements 52 in the form of rivets. The central portions of the distancing elements 52 are received with play in arcuate slots 54 (see FIG. 2) of the second flywheel 24. The second flywheel 24 has windows 56 (see FIG. 2A) which are mated by windows 58 and 60 of the respective discs 22 and 50. Extending into the respective windows 56 are arms 64 of a floating type spring retainer ring 66 which is rotatably coupled with an inner peripheral sleeve portion 68 of the second flywheel 24. As best seen in FIG. 2A, each of the windows 56 receives two sets of dual coil springs 70 and 72 which are separated by the arm 64 and further extend into the respective windows 58 and 60. The dual coil springs 70 and 72 yieldably oppose rotation of the flywheels 22 and 24 relative to each other. Thus, the discs 22 and 50 constitute an input component of a damper 74, the second flywheel 24 constitutes an output component of the damper 74 and the dual coil springs 70 and 72 constitute energy storing spring means of the damper 74. The angular displacement of the flywheels 22 and 24 relative to each other is limited, by engagement of the distancing elements 52 with the circumferential edges of the respective arcuate slots 54, to a predetermined angle $\theta 1$ as shown in FIG. 2.

Figure 3:
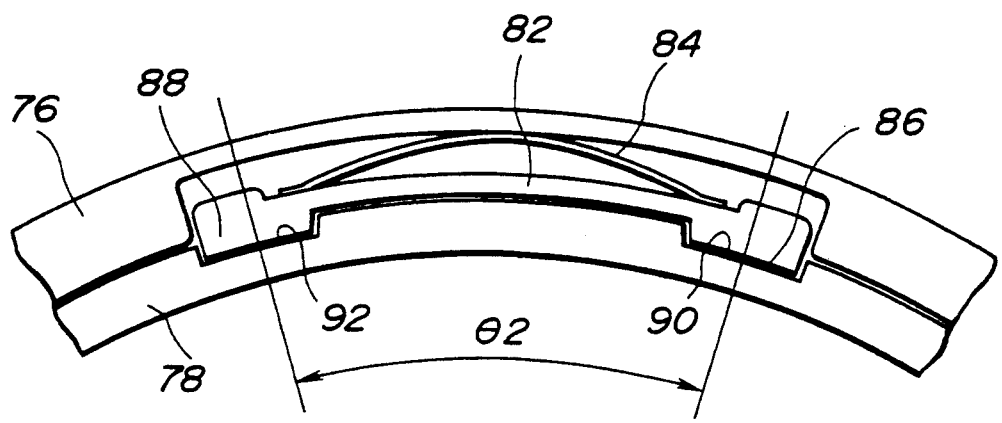
FIG. 3 is a fragmentary sectional view taken through the line III—III of FIG. 1, of a locked position of the lock-up mechanism.
Figure 4:
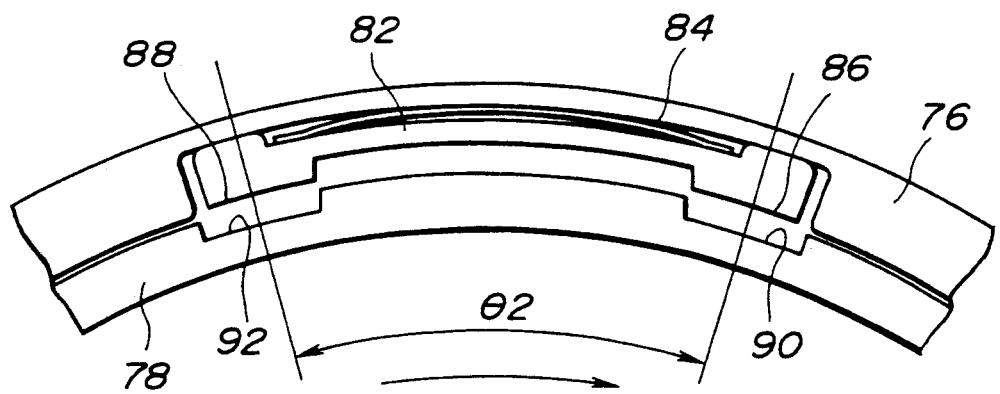
FIG. 4 is a view similar to FIG. 3 showing an unlocked position of the lock-up mechanism.

The outer peripheral portion 76 of the second flywheel 24 constitutes a complete rim which surrounds a ring 78 which has inwardly extending portions affixed to the disc 50 by the before mentioned rivets 52. As best seen in FIG. 2, the rim 76 is formed with one or a plurality of radial bores 80, each of which receives an arcuate lock component 82 and a resilent element 84 for biasing the lock component 82 to project radially inwardly out of the radial bore 80. The lock component 82 has two angularly distant teeth 86 and 88 which are arranged to engage with two angularly distant tooth spaces 90 and 92 formed in the ring 78 when the damper 74 is idle or in neutral state position as illustrated in FIG. 2. The angular displacement between the two angularly distant teeth 86 and 88 is a second predetermined angle $\theta 2$ that is greater than the first predetermined angle $\theta 1$ in order to prevent engagement of the teeth 86 and 88 with the respective tooth spaces 90 and 92 until the dampers 74 become idle. When the dampers 74 are idle with the engine 12 at rest, the lock component 82 assumes a locked position as illustrated in FIG. 3. In this locked position, the lock component 82 engages one of circumferential edges of the radial bore 80 upon subsequent rotation of the engine 12. Thus, the flywheels 22 and 24 rotate as a unit. As the engine speed increases, centrifugal force which the lock component 82 is subject to increases. Upon engine speed increasing upto a predetermined engine speed, i.e., an idle speed, the centrifugal force overcomes force due to the resilient element 84 urging the lock component 82 radially outwardly to an unlocked position as illustrated in FIG. 4, allowing rotation of the flywheels 22 and 24 relative to each other. In this unlocked position, the lock component 82 is retracted into the radial bore 80 completely and the resilient element 84 becomes flat. Thus, the radial bore 80, lock component 82 with two teeth 86 and 88, resilient element 84 and two tooth spaces 90 and 92 constitute a lock-up mechanism 100. In order to cooperate with the rim 76 to define the radial grooves 80, an annular side plate 102 is affixed to the rim 76 by rivets 104 (see FIG. 1).

As shown in FIG. 1, an annular friction plate 106 is disposed around the bearing 48 between the flywheels 22 and 24 in order to exert a frictional force upon the flywheels 22 and 24 during their relative rotation.

Figure 2:
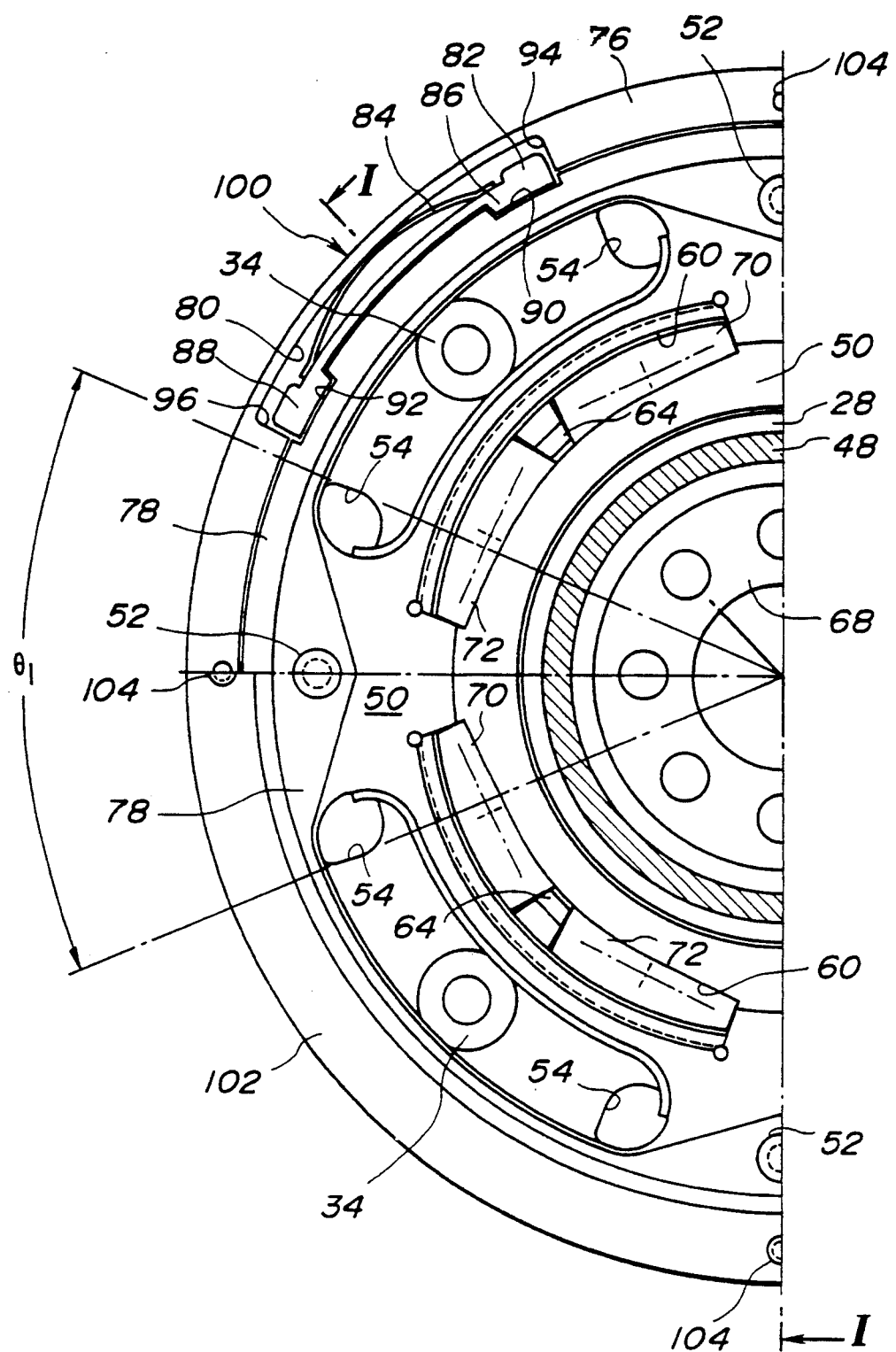
FIG. 2 is a fragmentary end view of the assembly with a torque converter removed and a cover ring partly removed.
Figure 2A:
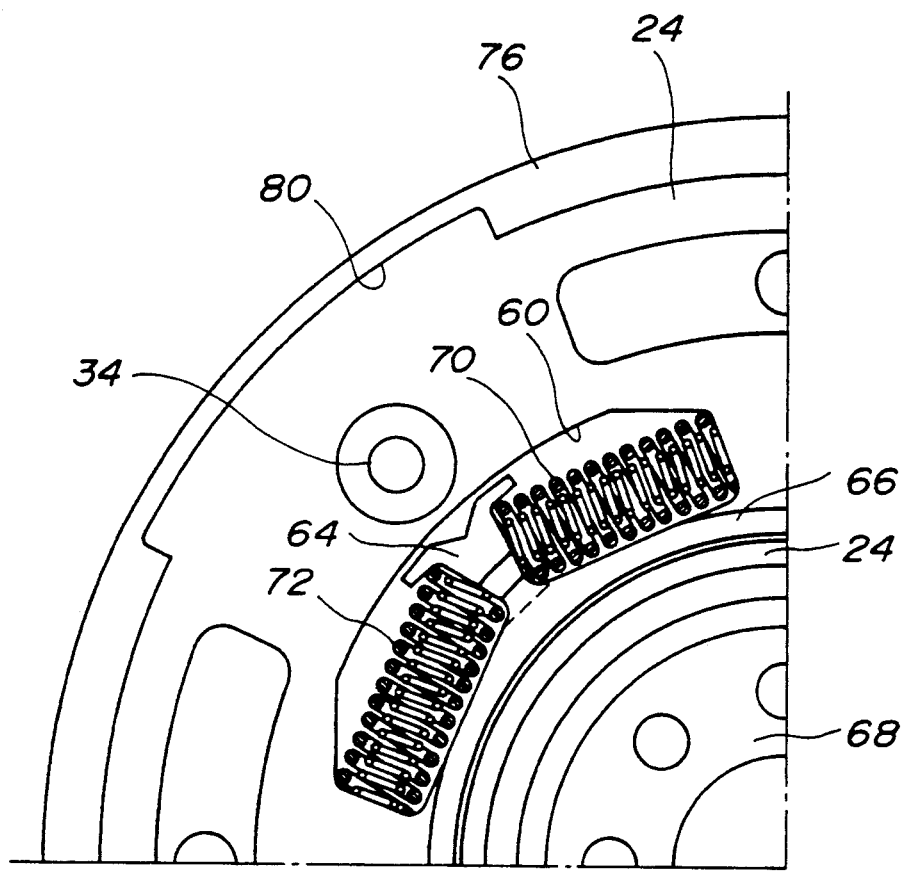
FIG. 2A is a fragmentary view of FIG. 2 with unnecessary components removed to show spring means of the damper.

It is assumed that the engine 12 is stationary, the damper 74 is idle wherein the parts assumes the position as illustrated in FIG. 2 and the teeth 86 and 88 of the lock component are received in the respective two tooth spaces 90 and 92. In this position, the flywheels 22 and 24 rotata as a unit without any rotation relative to each other. After the engine 12 has been started, the flywheels 22 and 24 rotate as a unit with the damper 74 kept idle. This state is maintained until the engine speed increases to the idle speed and the vibrations are effectively suppressed owing to the inertia of toe total mass of the flywheels 22 and 24. At or beyond the idle speed, the lock component 82 is retracted into the radial bore 80 owing to the centrifugal force and the teeth 86 and 88 disengage out of the respective tooth spaces 90 and 92. Thus, transmission of torque between the flywheels 22 and 24 is beared by the damper 74.

Figure 5:
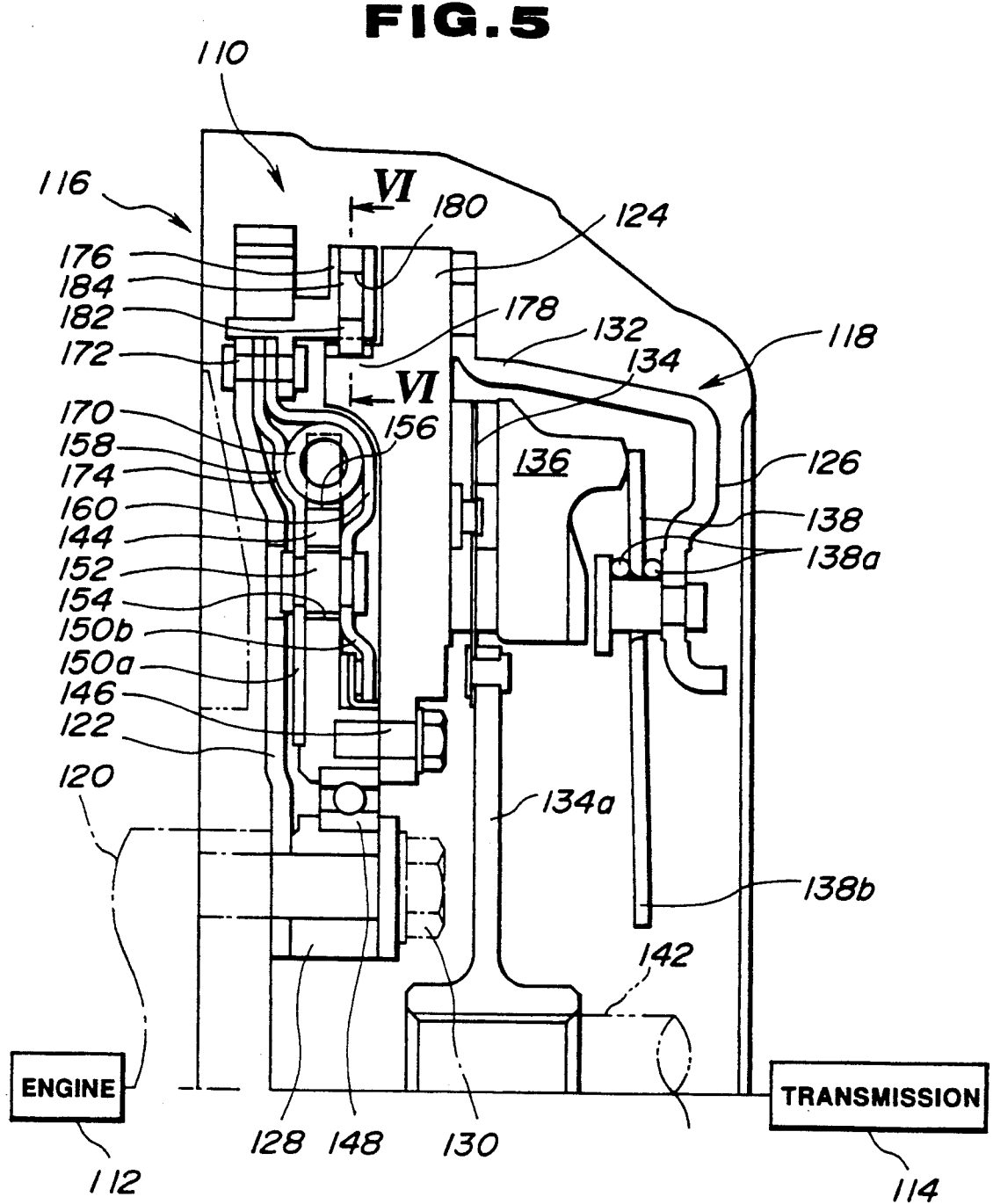
FIG. 5 is a fragmentary axial sectional view of second embodiment of a torsion damping assembly with a lock-up mechanism according to the present invention.
Figure 6:
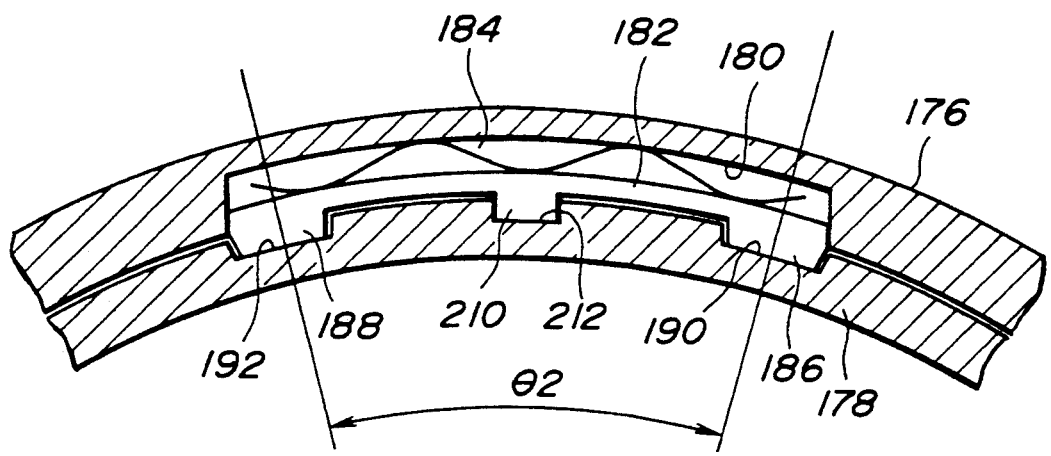
FIG. 6 is a fragmentary enlarged sectional view taken through the line IV—IV of FIG. 5 of a locked position of the lock-up mechanism.
Figure 7:
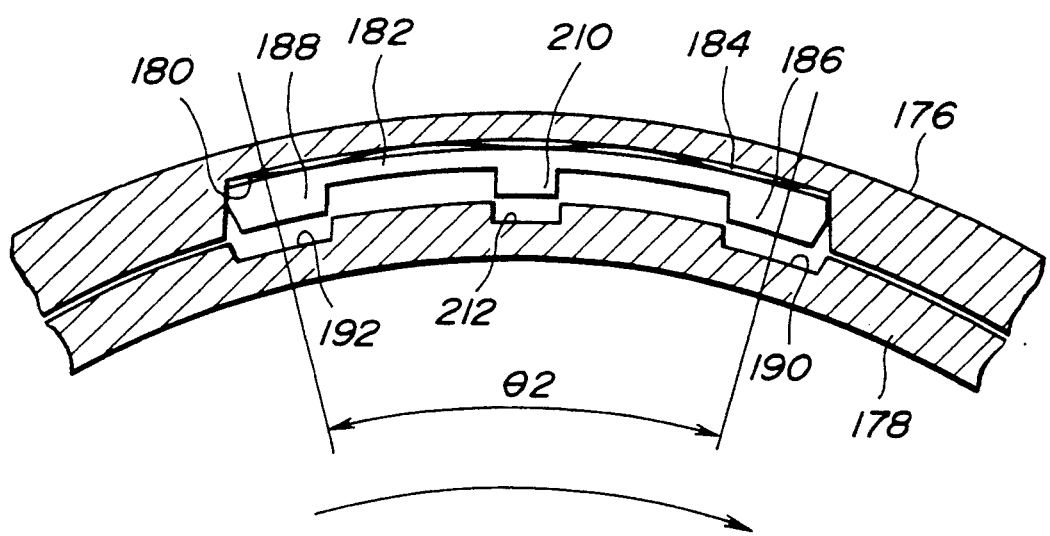
FIG. 7 is a similar view to FIG. 6 of an unlocked position of the lock-up mechanism.

Second embodiment is explained in connection with FIGS. 5, 6 and 7. A torsion damping assembly 110 shown in these Figures is substantially the same as the torsion damping assembly 10. However, the assembly 110 is different from the assembly 10 in the provision of a friction clutch 126 in lieu of the torque converter 26.

The torsion damping assembly 110 operates between an internal combustion engine 112 and a change-speed transmission 114 in a motor vehicle. The assembly 110 comprises two coaxial units 116 and 118 the first of which includes a crankshaft 120 and a first flywheel 122, and the second of which includes a second flywheel 124 and the friction clutch 126. The crankshaft 120 affixed to the first flywheel 122 and a reinforcement plate or member 128 by bolts 130, and a housing or cover 132 of the friction clutch 126 is affixed to the second flywheel 124. When the friction clutch 126 is engaged, its clutch disc 134 transmits torque to an input part 142 of the transmission 114. The friction clutch 126 further comprises a pressure plate 136 which normally bears against one of two friction linings on the clutch disc 134 and urges the other lining into torque-receiving engagement with the second flywheel 124. A diaphragm spring 138 of the friction clutch 126 is tiltable between two seats 138a of the cover 132 and normally bears against the peripheral portion of the clutch disc 134 so that the internally splined hub 134a of the clutch disc 134 rotates the externally splined portion of the input part 142 of the transmission 114. In order to disengage the friction clutch 126, the radially inwardly extending prongs 138b of the diaphragm spring 132 is moved in a direction to the left (viewing in FIG. 5) in order to move the radially outermost portion of the diaphragm spring 138 in a direction away from the second flywheel 124.

A bearing 148 is disposed between the reinforcement plate 128 affixed to the first flywheel 122 and a hub plate 144 affixed to the second flywheel 124 by bolts 146. Two side discs 150a and 150b are rigidly connected to each other by distancing elements 152 in the form of rivets. The central portions of the distancing elements 152 are received with play in arcuate slots 154 of the hub plate 144. The hub plate 144 has inward cutouts 156 which are mated by pockets 158 and 160 of the respective discs 150a and 150b. Each of the inward cutouts 156 receives at least one coil spring 170 which extends into the respective pockets 158 and 160. The side discs 150a and 150b have their peripheral portions rigidly connected to the first flywheel 122 by rivets 172. Thus, the discs 150a and 150b constitute an input component of a damper 174, the hub plate 144 constitutes an output component of the damper 174 and the coil spring 170 constitute energy storing spring means of the damper 174. The angular displacement of the flywheels 122 and 124 relative to each other is limited, by engagement of distancing element 152 with edges of the respective arcuate slots 154, to a predetermined angle $\theta 1$.

With the rivets 172, a complete rim 176 is rigidly connected to the outer peripheral portion of the first flywheel 122. The rim 176 surrounds a reduced diameter portion 178 of the second flywheel 124. As best seen in FIG. 6, the rim 176 is formed with one or a plurality of radial bores 180, each of which receives an arcuate lock component 182 and a resilient element 184 for biasing the lock component 182 to project radially inwardly out of the radial bore 180. The lock component 182 has two angularly distant remotest teeth 186 and 188 which are adapted to engage with two angularly distant remotest tooth spaces 190 and 192 formed in the reduced diameter portion 178 of the second flywheel 124. The lock component 182 further has a central tooth 210 which is adapted to engage a central tooth space 212 between the two remotest tooth spaces 190 and 192. Only when the damper 174 is idle or in neutral state position as illustrated in FIG. 6, the teeth 186, 188 and 210 of the lock component 182 can engage the respective tooth spaces 190, 192 and 212. The angular displacement between the two angularly remotest distant teeth 186 and 188 is a second predetermined angle $\theta 2$ that is greater than the first predetermined angle $\theta 1$ in order to prevent engagement of the teeth 186, 188 and 210 with the respective tooth spaces 190, 192 and 212 until the dampers 174 become idle. FIG. 7 illustrates the position of the lock component 182 when engine speed increases beyond the idle speed position. Thus, the radial bore 180, lock component 182, with three teeth 186, 188 and 210, resilient element 184 and three tooth spaces 190, 192 and 212 constitute a lock-up mechanism 200.

The operation of this second embodiment is substantially the same as the first embodiment.

What is claimed is:

1. An assembly for damping vibrations in a torque transmitting arrangement between an engine and an input part of a transmission, comprising:

a first flywheel connectable to the engine;

a second flywheel connectable to the input part of the transmission;

said first and second flywheels being rotatable relative to each other;

at least one damper including spring means operative to yieldably oppose rotation of said flywheels relative to each other;

at least one lock-up mechanism including centrifugal force responsive means operative to prevent rotation of said flywheels relative to each other after said damper has become idle when rotation of said first flywheel is lower than a predetermined speed value, said centrifugal force responsive means including a radial bore formed in a circumferential portion of said second flywheel, a lock component slidably received in said radial bore, and resilient means for biasing said lock component in such a direction as to cause said lock component to project out of said radial bore, said lock component having two angularly distant teeth, and two angularly distant tooth spaces formed in said first flywheel, said two angularly distant teeth being arranged to engage with said two angularly distant tooth spaces, respectively, when said damper is idle; and means for limiting rotation of said flywheels relative to each other to a first predetermined angle, wherein said two teeth of said lock component are angularly distant by a second predetermined angle that is greater than said first predetermined angle.

2. An assembly for damping vibrations in a torque transmitting arrangement between an engine and an input part of a transmission, comprising:

a first flywheel connectable to the engine;

a second flywheel connectable to the input part of the transmission;

said first and second flywheels being rotatable relative to each other;

at least one damper including spring means operative to yieldably oppose rotation of said flywheels relative to each other;

at least one lock-up mechanism including centrifugal force responsive means operative to prevent rotation of said flywheels relative to each other after said damper has become idle when rotation of said first flywheel is lower than a predetermined speed value, said centrifugal force responsive means including a radial bore formed in a circumferential portion of said second flywheel, a lock component slidably received in said radial bore, and resilient means for biasing said lock component in such a direction as to cause said lock component to project out of said radial bore, said lock component having three angularly distant teeth, and three angularly distant tooth spaces formed in said second flywheel, said three angularly distant teeth being arranged to engage with said three angularly distant tooth spaces, respectively, when said damper is idle; and means for limiting rotation of said flywheels relative to each other to a first predetermined angle, wherein, of said three teeth of said lock component, the two of them spaced furthest from each other are angularly distant by a second predetermined angle that is greater than said first predetermined angle.

* * * * *